May 21, 1946.                T. A. PETRY ET AL                2,400,654
                    METHOD OF SEPARATING HYDROCARBONS
                           Filed Feb. 5, 1941
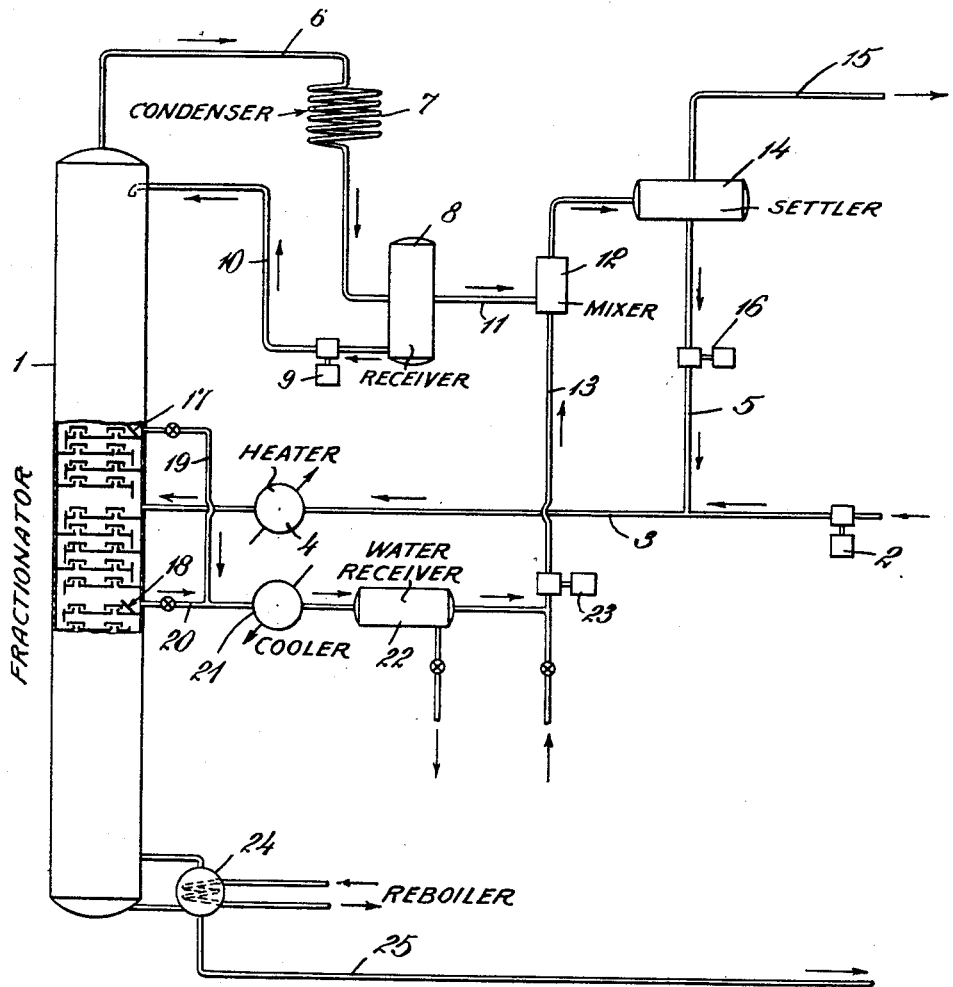
THEODOR A. PETRY
HERBERT K. HOLM
    INVENTORS
BY
   ATTORNEY Patented May 21, 1946

2,400,654

UNITED STATES PATENT OFFICE 2,400,654

METHOD OF SEPARATING HYDROCARBONS

Theodor A. Petry, Wenonah, and Herbert K. Holm, Woodbury, N. J., assignors to Socony-Vacuum Oil Company, Incorporated, New York, N. Y., a corporation of New York Application February 5, 1941, Serial No. 377,445

1 Claim. (Cl. 202—42)

This invention has to do with the separation of aromatic and non-aromatic hydrocarbons of substantially similar boiling points by distillation in the presence of an added material, herein referred to as an azeotropic agent, which, forms constant boiling mixtures with the non-aromatic hydrocarbons which constant boiling mixtures boil below the boiling point of the aromatic hydrocarbon or of any constant boiling mixture which may be formed therewith.

In such processes the desired aromatic material is recovered as a still-bottom product, the still overhead being a mixture of the non-aromatic hydrocarbons and the azeotropic agent. From this mixture, the azeotropic agent must be removed for return to the process and to permit conventional disposal of the non-aromatic hydrocarbons. Since the usually used azeotropic agents are also usually partly soluble or miscible with hydrocarbons but also capable of being precipitated or extracted therefrom by water, that method of separation is widely adopted, giving rise to an aqueous solution of the azeotropic agent, and requiring a further distillation for separation of this mixture before return of the azeotropic agent to the system.

This invention has for its object the provision of such a system wherein the separate recovery of azeotropic agent from an aqueous mixture is avoided, wherein increased efficiency of separation of aromatic material within the main system is accomplished by the use of water-azeotropic agent mixtures therein and wherein the separation of unwanted water from the water-azeotropic agent mixture may be accomplished within the main distillation steps. All of these and other important objects in part obvious and in part pointed out hereinafter may be accomplished by the method of operation herein disclosed.

This invention is based upon the discovery that in a properly conducted extraction, the extraction of the azeotropic agent from the condensate mixture may be accomplished by the use of relatively small amounts of water, that the introduction, to the main distillation step of the resulting aqueous azeotropic agent may actually enhance the effectiveness of the main separation, and that the water so introduced may be withdrawn from the distillation operation as a side stream.

In order to understand this invention, reference is made to the drawing attached to this specification, the single figure of which shows in diagram form the process herein discussed. In this drawing 1 is a fractionating column, to which a feed consisting of aromatic and non-aromatic hydrocarbons of substantially similar boiling point is forwarded by pump 2 through pipe 3 and heater 4, where it is heated to distillation temperature. An azeotropic distillation assistant mixture later described is added by pipe 5 prior to heating. From the top of the fractionator a vapor comprising a constant boiling mixture of an azeotropic agent and non-aromatic hydrocarbons passes through pipe 6, and condenser 7 to receiver 8, from which a portion is returned for reflux by pump 9 and pipe 10. That portion withdrawn as overhead product passes by pipe 11 to mixer 12 where it is admixed with water from pipe 13 the whole then passing to separator 14 wherein the non-aromatic hydrocarbons separate in an upper layer to be withdrawn from the system by pipe 15 and a lower layer comprising an aqueous solution of the azeotropic agent.

This aqueous solution of azeotropic agent is passed by pump 16 into pipe 5 and is used as the distillation assistant. In the fractionator 1, dependent upon the temperature gradients therein as determined by the aromatic being recovered, the water will concentrate at some point between the ends of the column either above the feed as at 17, or below it, as at 18 and by provision of suitable trap trays at the proper point may be withdrawn through pipe 19 or pipe 20 to pass through cooler 21 to storage drum 22, from which it may be forwarded to mixer 12 by pump 23. Heat will be furnished to the bottom of fractionator 1 by reboiler 24 from which a still bottom product, constituting the desired aromatic material, may be withdrawn, in the usual manner, by pipe 25.

The method herein disclosed, while applicable broadly over the field of aromatic recovery under appropriate conditions, is particularly adaptable to the recovery of toluene from a close cut petroleum fraction using methanol as an azeotropic agent. The following exemplary data is directed to this specific application, but it is to be understood the invention is not limited thereto.

Using a certain toluene containing petroleum fraction of specific gravity 0.7717 boiling between 200 and 260° F. (ASTM) having a toluene content of 20.7%, the following data were observed.

Table I

| Methanol used, %/vol. on charge | Water present, %/vol. on charge | Yield of toluene of 98% purity, %/vol. | |
|---|---|---|---|
| | | Based on charge | Based on available toluene |
| 150 | None | 16.0 | 76 |
| 150 | None | 16.0 | 76 |
| 150 | 41 | 18.5 | 87 |

The marked improvement in operation brought about by the addition of water to the distillation step is obvious. In this operation the water may be removed from the distilling column below the feed.

Turning now to the extraction of methanol from the overhead condensate mixture from a similar distillation, wherein the extraction was by a four stage counter current process at 80° F. on a methanol-hydrocarbon mixture containing 47.7 percent by volume of hydrocarbons of specific gravity 0.7485, extraction with varying total amounts of water yielded the data in the following table.

Table II

| Ratio water/methanol-hydrocarbon mixture by volume | Methanol content %/vol. hydrocarbon layer | Water-methanol layer | | |
|---|---|---|---|---|
| | | Methanol content, %/vol. | Hydrocarbon, %/vol. | |
| | | | Based on extract | Based on hydrocarbon chgs. |
| 0.5:1 | None | 48.8 | 0.01 | 0.02 |
| 0.25:1 | None | 65.7 | 0.20 | 0.28 |
| 0.15:1 | None | 76.1 | 0.50 | 0.60 |
| 0.05:1 | None | 90.6 | 7.6 | 8.3 |

From this we see that the complete recovery of methanol may be effected by amounts of water much less than those useful in the distillation step. For example the methanol-hydrocarbon mixture containing 47.7% hydrocarbons may be completely freed of methanol by adding water only to the extent of 15% based upon methanol-hydrocarbon mixture or 28.7% based on methanol present, with only 0.60% of the hydrocarbons originally present being found in the extract and constituting 0.50% thereof. Since the extract is recycled to process, these hydrocarbons are likewise returned, and their presence is of no importance.

The process then is found to have the general characteristics of a closed process, wherein a charge consisting of hydrocarbons, water and azeotropic agent is fed to a continuous still, from which there are removed aromatic hydrocarbon, water, and a constant boiling mixture of azeotropic agent and non-aromatic hydrocarbons, to which mixture the water from the still is added to produce methanol-free non-aromatic hydrocarbons which are withdrawn from the process and a water-azeotropic agent mixture which is returned to the still (in admixture with the feed). This process is further characterized by the fact that the separation within the still is improved by the presence of water therein in amounts which are greater than the amount needed to effect complete recovery of the azeotropic agent from the overhead condensate.

In this specification and in the claims, the term "constant boiling mixture" is made use of in full recognition of the fact that the non-aromatic hydrocarbons so removed are themselves a mixture and when considered from the standpoint of precision the term "constant boiling" is inexact. However, for any commercial distillation, and particularly for a continuously operating commercial distillation, the variations are sufficiently small that the material may be readily handled from the design and operating standpoint as a constant boiling mixture, and the term is used with that understanding.

Since with hydrocarbon fractions having low aromatic contents it is frequently desirable to conduct the azeotropic distillation in two steps recovering as a still bottom from the first step a fraction more concentrated in aromatic and as a still bottom from the second step the desired aromatic in a condition of relatively high purity, the distillation conditions in both steps being similar except for the necessary variations in amount of azeotropic agent, etc., dependent upon the different concentrations of aromatic in the feed the invention is to be understood as being applicable equally to such two-step azeotropic distillation operation.

We claim:

In a method for the separation of toluene from a complex mixture containing said toluene and non-aromatic hydrocarbons of substantially similar boiling point, the improvement which comprises the steps of adding to the complex mixture an aqueous solution of methanol, which methanol is capable of forming a constant boiling mixture with the non-aromatics which constant boiling mixture boils below the boiling point of the toluene and below the boiling point of any constant boiling mixture which may be formed by any mixture of methanol with said toluene, water being present in said aqueous solution in the amount of approximately 40% based on the charge of the complex mixture, distilling off the water, distilling off a constant boiling mixture of methanol and non-aromatics, adding water to said constant boiling mixture, separating the non-aromatics from the constant boiling mixture by settling and returning the aqueous solution of water and methanol to the original distillation zone for continuation of the process.

THEODOR A. PETRY.
HERBERT K. HOLM.